United States Patent [19]

Ballard

[11] 4,397,919
[45] Aug. 9, 1983

[54] EXPLOSION RESISTANT BATTERY CELLS

[75] Inventor: Geoffrey E. H. Ballard, El Paso, Tex.

[73] Assignee: Standard Oil Company, Chicago, Ill.

[21] Appl. No.: 265,342

[22] Filed: May 19, 1981

Related U.S. Application Data

[63] Continuation of Ser. No. 22,696, Mar. 22, 1979, abandoned.

[51] Int. Cl.³ .......................................... H01M 2/12
[52] U.S. Cl. ...................................... 429/53; 429/72; 429/89
[58] Field of Search ................................... 429/53–56, 429/79, 89, 174, 185, 72, 26; 317/230

[56] References Cited

U.S. PATENT DOCUMENTS

| | | | |
|---|---|---|---|
| 1,930,578 | 10/1933 | Barrett | 429/82 X |
| 2,203,902 | 6/1940 | Georgiev | 429/56 |
| 2,706,214 | 4/1955 | Arbogast | 429/66 |
| 2,766,408 | 10/1956 | Georgiev et al. | 429/56 X |
| 3,578,500 | 5/1971 | Maricle et al. | 429/194 X |
| 3,664,878 | 5/1972 | Amthor | 429/54 |
| 3,877,992 | 4/1975 | Urry | 429/185 X |
| 3,909,303 | 9/1975 | Rosansky et al. | 429/56 |
| 4,053,692 | 10/1977 | Dey | 429/174 X |
| 4,115,629 | 9/1978 | Dey et al. | 429/56 |

Primary Examiner—Anthony Skapars
Attorney, Agent, or Firm—James W. Potthast

[57] ABSTRACT

An explosion resistant battery cell incorporating safety features adapted to counter the effects of the build-up of high internal pressures. The external metallic casing for the cell has a non-cylindrical cross-section which may be square, rectangular or other geometric configuration other than cylindrical to allow bulging of the outer walls which may result from internal pressure build-up. A thermal venting mechanism is provided in the nature of a low melting point metal plug inserted in the end of an associated electrolyte fill tube, the metal plug providing a hermetic seal but having a melting point considerably below the temperature at which explosion of the battery cell might occur depending on the electrolyte being used.

14 Claims, 7 Drawing Figures

U.S. Patent     Aug. 9, 1983     4,397,919
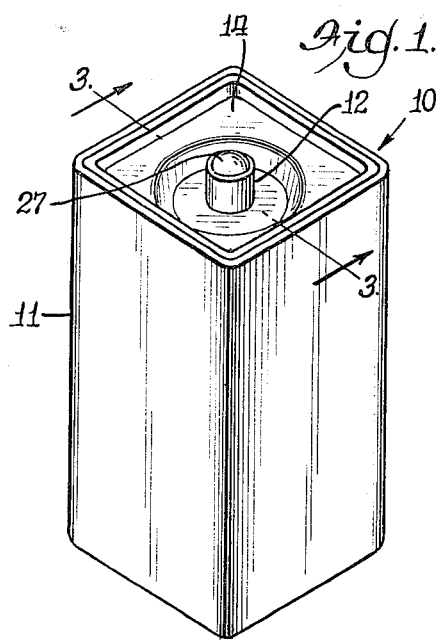
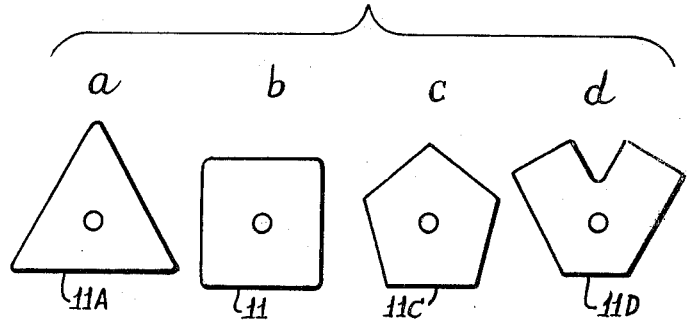
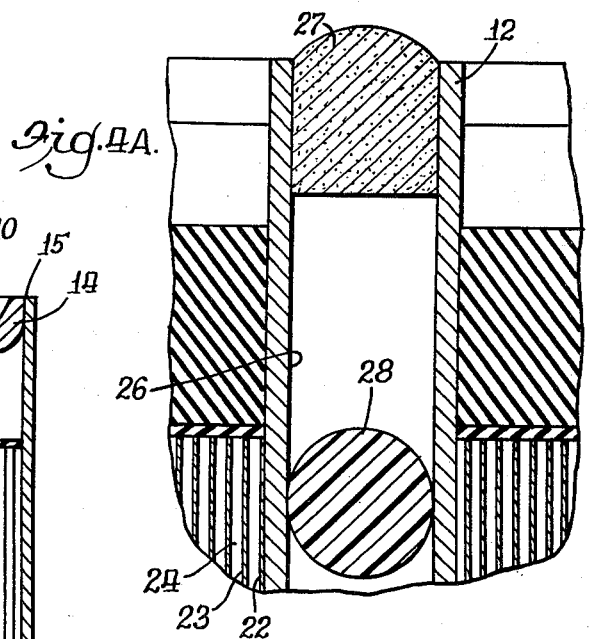
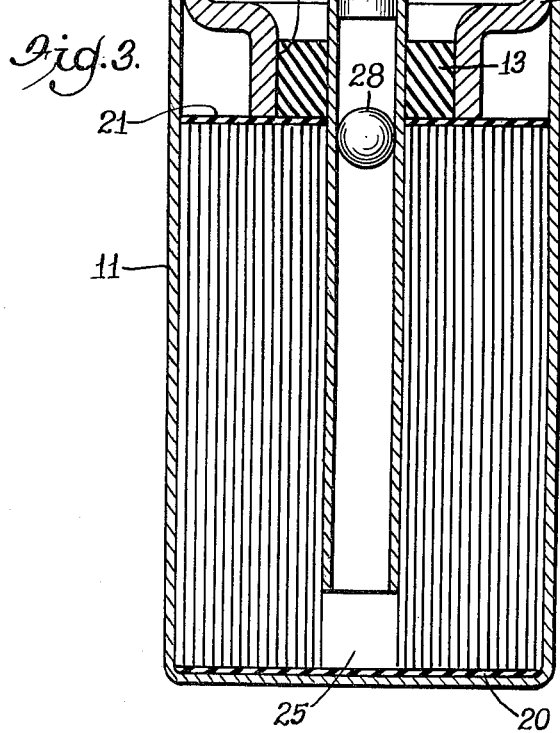
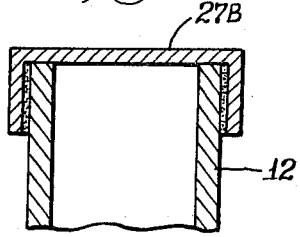
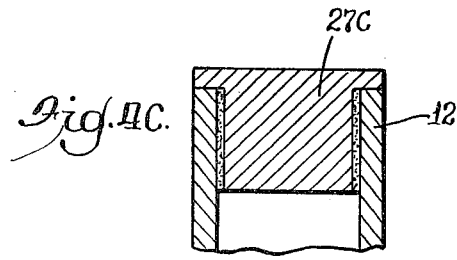
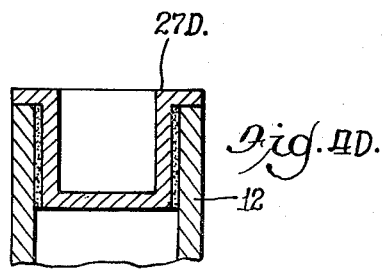

EXPLOSION RESISTANT BATTERY CELLS

This application is a continuation of application Ser. No. 022,696, filed Mar. 22, 1979, now abandoned.

BACKGROUND OF THE INVENTION

1. Field of the Invention

This invention relates generally to the field of batteries and more particularly to pressure release features incorporated in battery cells to avert explosion. The invention is particularly applicable to lithium sulphur dioxide battery cells but may be utilized on other types of battery cells where similar problems occur.

2. Description of the Prior Art

The lithium sulphur dioxide types of batteries are well-known in the art and are most useful in application requiring long shelf life and relatively high current output over brief time spans. Because of their properties, such batteries have been used for powering emergency locator transmitters, personal distress flashers and disposable flashlights. For applications where intermittent high drain is demanded, such batteries are also useful in computer memories, smoke alarms, and photoflash equipment, pingers, transponders and electronic clock standby power. Such batteries also have superior low temperature performance characteristics which makes them useful in arctic hardware, remote sensing equipment and in emergency communications equipment. For their size and weight such batteries store a great amount of energy.

The conventional lithium sulphur dioxide batteries are not without their disadvantages. The cells usually are completely sealed so as to avoid the release of sulphur dioxide which is a very noxious gas. In the event of a short circuit or heating of the battery beyond some predetermined temperature, pressure can build up within the cell and it can eventually explode with the force of a pipe bomb. To avert such possibility, pressure actuated vents or rupture discs are frequently employed in this and other types of battery cells to relieve internal pressure without explosive force. An example of the type of vent employed may be as illustrated in the Patent to Amthor U.S. Pat. No. 3,664,878 entitled "Pressure Relief Vent Valve for a Fluid Type Sealed Container Especially an Alkaline Galvanic Cell". Numerous other examples of vents or rupture discs can also be found in the patent art.

Reported accidents with present commercially available batteries have led to the conclusion that none of the current methods used to vent batteries of the lithium sulphur dioxide type are completely safe. In fact, their performance has become so unpredictable that the Ministry of Transport of Canada has ordered their removal from all emergency locator transmitters in light aircraft.

An examination of the results of explosions that have occurred have led to the conclusion that such explosions could be attributed to two possible causes. Both of these causes are traceable to failure of the mechanical vents in existing cells. One cause is due to overheating which occurs due to a short-circuit, whether internally or within a mechanism to which the battery is connected. In a lithium sulphur dioxide cell all the energy capacity in the cell is sufficient to cause internal heating and raise the temperature within the cell to in excess of 180° C., which is the melting temperature of lithium.

The second cause of explosion is attributable to external heating of the battery cell due to an external fire or due to flaring of an adjacent cell. The provision of some sort of venting means is imperative to avert such explosions. Because of the noxious nature of the sulphur dioxide within the battery, care must be taken to make sure that the batteries do not vent at normal temperatures and under normal usage. At the same time, since the explosive temperature of 180° C. is so low, it has been very difficult to design mechanical vents or rupture discs that will always open between the ranges of temperatures that are considered normal and the explosive temperature of 180° C.

SUMMARY OF THE INVENTION

An object of the present invention is to provide as part of a potentially explosive battery cell an external metallic casing of a non-cylindrical cross-section having wall surfaces capable of bulging due to internal pressure developed within the cell whereby the internal volume of said cell may be increased to accomodate the increases in internal pressure.

Another object of the invention is to provide means for positive thermal venting of a potentially explosive battery cell including providing a sealing plug of a low melting point metal having a melting point lower than the explosion temperature of the battery cell.

Another object of the invention is to provide an electrolyte fill tube permanently mounted in a battery cell and a low melting point metal seal in the end of said fill tube adapted to melt at a predetermined temperature to permit the escape of gas from the cell should the internal temperature of a cell rise to a predetermined dangerous level.

Other objects and advantages of the invention will become more apparent from the following description and accompanying drawings.

BRIEF DESCRIPTION OF THE DRAWINGS

FIG. 1 is a perspective external view of the improved battery configuration of the present invention;

FIGS. 2A, B, C, and D are alternative outer shell configurations for the battery of FIG. 1;

FIG. 3 is a longitudinal sectional view taken on line 3—3 of FIG. 1; and

FIGS. 4A, B, C, and D are alternative configurations of a low melting point eutectic plug for the battery of FIG. 1.

BRIEF DESCRIPTION OF THE PREFERRED EMBODIMENT

A preferred embodiment of an improved battery embodying the present invention is shown in perspective view in FIG. 1 and is designated generally by the numeral 10. The battery 10 comprises an outer shell 11 generally rectangular in cross-section, a central electrolyte fill tube 12 which also serves as one electrode for the battery 10 an insulating glass collar 13 surrounding the tube 12 and a rectangular cap portion 14. The outer casing or shell 11 preferably is made of an annealed stainless steel preferably of at least 0.010 in. thickness. The cap 14 and fill tube 12 also are preferably made of stainless steel. The outer perimeter 15 of the cap 14 conforms closely to the shape of the upper end of the outer shell 11 and is adapted to be welded thereto to provide a hermetic seal. The cap 14 is also generally concave in configuration and is formed with a central circular opening 16 which receives the glass collar 13. The glass insulator 13 forms a pressure tight hermetic seal between the opening 16 and the outer periphery of the tube 12.

Referring now to FIG. 3 there is illustrated in greater detail the internal construction of the battery 10. The axial length of the central fill tube 12 is seen to be less than that of the length of the outer shell 11. The end of tube 12 is spaced from the bottom interior of the shell 11. A rectangular insulator 20 is disposed on the bottom interior of the shell 11. A top insulating collar 21 surrounds the tube 12 and abuts against the bottom of the cap 14. The cathode 22 and anode 23 of the preferred embodiment of battery 10 are a spiral wrapped configuration separated by an insulating sheet 24 and surrounding the central tube 12 to form an electrode-dielectric assembly. An electrolyte 25 fills the space between the windings of the spiral electrodes 22 and 23 between the top insulator 21 and the bottom insulator 20. While various electrolyte compositions might be utilized in the battery cell described, it is contemplated that the preferred embodiment will use an electrolyte containing lithium bromide and a substantial amount of sulphur dioxide.

A low melting point metal plug is used to seal the opening in the casing after electrolyte has been introduced therethrough into the cell.

The tube 12 is formed with an axial central bore 26 through which electrolyte is introduced into the cell, but other means could be utilized to accomodate introduction of the electrolyte. When using the fill tube 12 as herein described the low melting point metallic plug 30 may be a plug like plug 27 which seals the upper end of the tube 12 to finally seal the casing after introduction of the electrolyte. In addition, one or more thermoplastic spheres 28 are located within the bore 26 and form a pressure tight seal against the inner wall of the bore 26.

The sphere or spheres 28 preferably are made of polyethylene, polypropylene or other thermoplastic material which will deform at temperatures of approximately 128° C. The metal plug 27 which provides a hermetic seal may be any suitable metal alloy having a melting point below the explosive temperature of the battery cell which in the case of a cell containing lithium is a temperature of about 180° C. The metal plug 27 may be a eutectic metal. Excellent types of alloys which may be used for this purpose, for example, are lead-bismuth combinations, lead-tin combinations and indium combinations. When subjected to excessive external or internal heating, the thermoplastic spheres 28 will tend to deform and will be effective to partially release the internal pressure within the battery. At higher temperatures the metal plug 27 begins to melt and provides a direct escape route for release of pressure into the atmosphere.

The metal plug 27 is shown in FIG. 3 and FIG. 4A as a solid cylinder with a rounded outer end. The outer cylindrical surface of the plug 27 forms a pressure tight hermetic seal against the central bore 26. The plug 27 can be made in other configurations, some of which are shown by way of example in FIGS. 4B, 4C, and 4D.

Referring again to FIG. 1 and FIGS. 2A, B, C, and D the outer shell 11 or casing for the cell 10 is shown as generally rectangular in cross-section. The outer shell can take on other configurations such as shown in FIGS. 2A, 2C, and 2D. The triangular configuration of FIG. 2A and the square figure configuration of FIG. 2B provide the largest surface to volume ratios for the cells and thereby permit the greatest bulging for expansion to effect a dissipation of internal pressure build-up. The typical cylindrical or round configuration of most portable battery cells is not deemed acceptable herein. Thus we have here a combination of mechanical strength to avoid premature venting by means of wall deformation, and positive thermal relief by melting of the metal seal 27 prior to reaching explosive temperatures and pressures within the cell 10.

In manufacturing the cell the outer cylindrical casing may be stamped from a piece of stainless steel sheet material of the appropriate thickness. The insulating sheet 20 is inserted into the casing 11 and the electrode-dielectric assembly comprising the cathode 23, anode 22, insulating sheet 24, the insulating collar 21, the glass insulator 13, the cap portion 14 and the fill tube 12 is then fitted into the casing 11. Then the upper edge of the cap portion 14 is laser welded to the upper edge of the casing 11 to form a hermetic seal with the casing 11. Electrolyte is then introduced into the cell through the fill tube 12 until it reaches a level approximately coincident with the insulating collar 21. Then a temporary seal in the form, for example, of a thermoplastic ball 28 is inserted into the fill tube to a position intermediate the ends of the fill tube at approximately the level of the electrolyte. The thermoplastic ball is effective to provide a temporary seal to prevent venting during the cell manufacturing process. A metal plug or cap which may be a eutectic metal then is soldered into the upper end of the fill tube 12 to form a hermetic seal with the tube 12.

The invention thus provides in a single package an extremely safe battery cell and is illustrated herein as particularly adaptable for use in a lithium sulphur dioxide battery. The cell 10 can be positively filled with liquid electrolyte leaving no ullage or gas bubble for expansion. Any large pressure created by the increase in volume of an essentially incompressable fluid is dissipated by the bulging of the shell casing 11. The material strength of the case 11 and the weldments to the cap 14, and the seal formed by the glass collar 13 are capable of withstanding the maximum pressure that theoretically can be developed within the cell due to an external short circuit, or due to a short circuit in the system to which the battery is connected. The meltable plug 27 insures venting of internal pressure before temperatures are reached at which an explosion can occur. The battery cell provided by this invention thus is capable of preventing the escape of sulphur dioxide under normal usage and under short circuit conditions and additionally guarantees that the battery will be vented before explosive temperatures are reached under extreme adverse conditions.

It is to be understood that the invention shown and described is by way of example and that many changes and modifications may be made thereto without departing from the spirit of the invention. The invention is not to be considered as limited to the embodiment shown and described except insofar as the claims may be so limited.

What is claimed is:

1. In an explosion resistant sealed battery cell having an electrolyte and an anode-cathode structure, the improvement comprising:

a casing formed in a non-cylindrical configuration to render it distortable in shape by internal pressure to increase its volume, said non-cylindrical casing being made of a flexible material and having such dimensions and configuration to enable such volume expanding distortion without the creation of any breaks in the casing which would vent the interior thereof to atmosphere; and thermally responsive means associated with said cell for hermetically sealing the cell before and during volume expansion, said thermally responsive means being operable to melt at some pre-determined temperature associated with an internal pressure in excess of that causing volume expansion, melting of said thermally responsive means venting the casing to release excessive pressure from within said casing after the pressure induced volume expansion has taken place.

2. The battery cell of claim 1 wherein said non-cylindrical casing is made of stainless steel and has a relatively thin wall construction.

3. The battery cell of claim 2 wherein
said stainless steel has minimum thickness of 0.010 inches.

4. The battery cell of claim 1 wherein
said sealing means includes a material having a melting point lower than a pre-determined explosive temperature for said cell.

5. The battery cell of claim 4 wherein
said material is made of a solder material having a low melting point.

6. The battery cell of claim 4 wherein
said material is made of a metallic eutectic material.

7. The battery cell of claim 1 wherein
the anode-cathode structure includes a permanently mounted electrolyte fill tube for introducing an electrolyte into the cell, and said thermally responsive sealing means comprises a plug of low melting point metallic material disposed in said fill tube.

8. The battery cell of claim 1 wherein
the anode-cathode structure includes a permanently mounted electrolyte fill tube for introducing an electrolyte into the cell, and a plug of thermoplastic material disposed within and sealingly engaging the inner surface of said fill tube to provide a temporary seal.

9. The battery cell of claim 8 wherein
said thermally responsive sealing means comprises a plug of low melting point metallic material which also is disposed in said fill tube at the outer end thereof.

10. The battery cell of claim 8 wherein
the electrolyte in the cell contains sulphur dioxide.

11. The battery cell of claim 8 where
said thermoplastic material plug is polyethylene or polypropylene.

12. The battery cell of claim 1 wherein
a major portion of the electrolyte in the cell comprises sulfur dioxide.

13. The battery cell of claim 1 wherein
the cell contains lithium, the electrolyte in the cell contains sulphur dioxide and the thermally responsive sealing means is made of a low melting point metallic material having a melting point lower than the melting point of lithium.

14. A battery cell, comprising:
a non-cylindrical casing constructed in a configuration and of a flexible material to expand its volume by bulging out its sides in response to otherwise explosive internal pressure levels within the casing, said casing material being sufficiently flexible to achieve such expansion without breaking open or otherwise venting the interior of the cell;

an anode-cathode structure, including a permanently mounted electrolyte fill tube and an electrolyte contained within said casing; and a low melting point metalic plug fused to the inside of said fill tube for hermetically sealing said casing up to temperatures of a predetermined maximum, said plug being adapted to melt at said maximum temperature to unplug the fill tube and vent the interior of said casing to its surroundings for averting explosion of the cell after said casing has expanded its volume.

* * * * *